US006521151B2

(12) United States Patent
Boney, Jr.

(10) Patent No.: US 6,521,151 B2
(45) Date of Patent: Feb. 18, 2003

(54) CONVERSION OF FIBER CORES INTO MOLDED PRODUCTS

(76) Inventor: John A. Boney, Jr., 411 S. Mulberry, Butler, AL (US) 36904

( * ) Notice: Subject to any disclaimer, the term of this patent is extended or adjusted under 35 U.S.C. 154(b) by 0 days.

(21) Appl. No.: 09/933,803

(22) Filed: Aug. 22, 2001

(65) Prior Publication Data

US 2002/0190410 A1 Dec. 19, 2002

Related U.S. Application Data

(63) Continuation-in-part of application No. 09/878,968, filed on Jun. 13, 2001, now abandoned.

(51) Int. Cl.[7] ............................ B27N 5/00; B29C 43/02

(52) U.S. Cl. ....................... 264/115; 264/123; 264/914; 425/82.1; 425/297; 425/407

(58) Field of Search ................................ 264/115, 123, 264/914, 913; 425/82.1, 297, 407, 412

(56) References Cited

U.S. PATENT DOCUMENTS 1,625,279 A 4/1927 Plumstead
2,019,452 A 10/1935 Hartford
3,736,221 A 5/1973 Evers et al.
3,940,466 A * 2/1976 Evers et al. ................ 264/115
4,123,489 A 10/1978 Kelley
4,867,383 A 9/1989 Terry et al.
5,122,228 A 6/1992 Bouchette et al.
5,262,003 A 11/1993 Chupka et al.
5,324,389 A 6/1994 Spencer
5,382,325 A 1/1995 Warda et al.
5,624,620 A * 4/1997 Turner ........................ 264/109
5,629,034 A 5/1997 Terada et al.
5,849,152 A 12/1998 Arnold et al.
5,997,785 A 12/1999 Skjelmose
6,000,640 A 12/1999 Krebs et al.
6,017,415 A 1/2000 Phillips et al.
6,021,598 A 2/2000 Holton

* cited by examiner

*Primary Examiner*—Mary Lynn Theisen
(74) *Attorney, Agent, or Firm*—Oblon, Spivak, McClelland, Maier & Neustadt, P.C.

(57) ABSTRACT

A method and apparatus for converting paper fiber articles into molded parts. The method and apparatus are particularly advantageous in converting paper fiber cores, utilized for winding and unwinding large quantities of paper products, into plugs which are inserted into the ends of the paper fiber cores. The method and apparatus are advantageous in that the material of the paper fiber cores is converted into a molded product without requiring repulping or slurrying of the paper fiber material as in conventional paper recycling methods. The method and apparatus also do not require the introduction of adhesives, and the paper fiber material is preferably maintained substantially dry throughout the process and apparatus.

40 Claims, 2 Drawing Sheets

CONVERSION OF FIBER CORES INTO MOLDED PRODUCTS

CROSS REFERENCE TO RELATED APPLICATIONS

The present application is a continuation-in-part of patent application Ser. No. 09/878,968, filed on Jun. 13, 2001 abn..

1. Field of the Invention

The invention relates to the conversion of fiber cores into molded products. In particular, the invention relates to a method and apparatus for converting cores, which are utilized for winding/unwinding of paper products, into molded products. The invention allows the material of the cores to be recycled without re-pulping of the fiber material.

BACKGROUND OF THE INVENTION

2. Discussion of the Background

In the paper industry, cores formed of a paper fiber material are utilized for winding a paper product thereon as the product is manufactured. Once the paper product is wound onto the core, the core and paper product are shipped to a customer or to another facility for use. For example, if the core is utilized for holding a supply of paperboard product to be utilized to manufacture cartons for frozen foods, after the paperboard product is wound upon the core, the core is shipped to the location at which the cartons are manufactured, and the core is utilized as the supply spool for the carton manufacturing equipment. Alternately, where the product is a towel or tissue product, the wound core can be transported to a location at which the product is unwound and cut to form consumer-sized portions or rolls of the product. Thus, the cores are utilized with a wide range of paper products for: (1) initial winding of the bulk paper product, (2) transportation of the paper product, and (3) unwinding of the paper product to form other products or different sized quantities of the product.

Typically, the cores are formed of a paper fiber material in which the paper is successively wound upon itself, with an adhesive material applied between each layer to bond the successive layers of paper as they are wound upon one another. The adhesive material can vary, and different adhesive materials can be utilized in a single core. For example, one type of adhesive can be utilized for inner layers of the core, with a different adhesive material utilized for subsequent layers, and possibly yet another adhesive material utilized for the outermost layers.

Once the paper fiber core has been formed and the adhesive has dried, a rigid core is obtained. The core is suitable for winding and subsequent handling of large quantities of paper products. The cores can have various diameters (typical inside diameters range from three to twelve inches) and lengths. The thickness "t" of the cores typically range from approximately three-eighths to one-half of an inch. FIGS. 1A and 1B depict an example of such a core. FIG. 1A depicts such a core 20 having a plug 22 inserted therein, while FIG. 1B depicts the plug 22 disassembled from the core 20. The plug is inserted into the end of the core. Only one plug 22 is shown in FIGS. 1A and 1B, however, it is to be understood that plugs are inserted into each end of the core. Also, for ease of illustration, a relatively short core is shown. Actually, the core is substantially longer than the plug. Core lengths typically range from 8 inches to 80 inches, while plug lengths typically range from one and one-eighth to one and one-half inches. During handling, the cores are typically gripped or clamped at their ends. The plugs are inserted into the ends of the cores to prevent the cores from collapsing during handling/transport. As shown in the drawings, the plugs typically include an aperture 24 to assist in removal of the plugs. For example, a rod can be inserted through the aperture 24 of one plug and used to push the plug at the opposite end from the core. The outside diameter of the plugs are tapered for better insertion and removal.

The plug has previously been formed with a molding process utilizing purchased wood shavings or chips, conventionally known as planters mill shavings. The planters mill shavings are fed through a hogger to break-down or decrease the size of the shavings, and then screened to provide wood particles of an appropriate size. Typically, the planters mill shavings must also be dried to decrease the moisture content in the shavings. After this processing, the wood particles are mixed with an adhesive, and then molded to form the plugs of a material similar to a particle board material.

Although such cores are sufficiently rigid for winding and unwinding of paper products, the cores can often become damaged or partially deformed after use, particularly as the fully wound cores are transported to the location at which the paper product is to be used or unwound from the core. In addition, the cores can be deformed in an unwinding operation, e.g., where a shaft is inserted into the core and pneumatically expanded to grip the inner surface of the core for an unwinding operation. Accordingly, the cores are typically not suitable for subsequent winding operations, and quite often the cores are used only once. Disposal of such cores can be problematic. Disposal in a landfill is wasteful of the material used in forming the cores. In addition, disposal of the cores is wasteful and costly in consuming landfill space. Moreover, if disposed in a landfill, it is sometimes necessary to break-down or cut-up the cores to reduce the landfill space, which can further increase the disposal cost.

Such cores can also pose difficulties if it is attempted to recycle the cores, for example, utilizing conventional paper recycling methods in which the paper material is re-pulped. The cores are problematic in this regard due to the significant amount of adhesive associated with the cores, which can lead to sticking problems when it is attempted to form the core material into another paper product. In order to practically utilize such cores in a repulping operation, it is believed that only a very small quantity of the core materials could be introduced with other paper product s and mixed with the other paper products, and even with this method, sticking problems could nevertheless result.

In view of the foregoing, a manner of disposing and/or recycling of paper fiber cores has been needed which avoids the wasteful disposal of such cores in landfills, while also avoiding the problems associated with repulping of the cores.

SUMMARY OF THE INVENTION

The invention provides a method and apparatus for converting paper fiber cores into molded products. Such products can include the plugs which are inserted into the ends of the core. However, the method and apparatus can also be utilized for molding other products as well. The present method and apparatus are environmentally advantageous in reducing the amount of wasted paper/wood products and landfill space associated with the disposal of such cores. In addition, the method reduces the cost and the amount of wood material required for forming molded products, including the plugs used with paper fiber cores, since the molded products are formed from the core materials rather than wood chips or shavings. Thus, the invention is advantageous economically, since the cost associated with disposal of the fiber cores is reduced and the cost of manufacturing of the molded products is also reduced.

With the present method and apparatus, the cores are initially mechanically broken down to form small particles. Where the molded product is a plug for paper fiber cores, the cores are preferably cut and then shredded to form small chip-size pieces or fiber bundles. In forming plugs, the resulting pieces are preferably confetti-size or the size of a match head (the particles are generally irregularly shaped, but preferably will have a size of approximately one-quarter of an inch or less, in terms of the largest dimension of the irregularly shaped particles). However, the size could vary depending upon the molded product to be manufactured and its strength requirements. The cut and shredded material is then fed through a blower to a separator device, which reduces the air in the material. Thereafter, a quantity of material needed to form a particular molded product is weighed to obtain the amount needed to form that product. Finally, the material is heated and compression-molded to form the final molded product. In accordance with the present method and apparatus, it has been recognized that the adhesives present in the paper fiber core are sufficient such that after the material has been mechanically broken down, it is not necessary to add additional adhesives to form the molded products. Also, it has been recognized that the moisture content typically present in such cores is such that it is not necessary to add moisture prior to molding. Further, the method is advantageous in that it avoids the need to repulp the paper utilized in such cores. Repulping is not only cost inefficient, but it also can be problematic due to the amount of adhesives associated with such cores as discussed earlier. As should be apparent, the invention is advantageous in many respects. One advantageous aspect of the present method and apparatus resides in avoiding the need for slurrying or repulping of the core material. In fact, the core material is preferably substantially dry throughout the process from the time the cores are mechanically broken down through the completion of the molding. As used herein, substantially dry means that the moisture content is below 20%. Preferably, the moisture content is below 15% and a moisture content in the range of 6–11% is particularly preferred. Since cores will typically have a moisture content in the 6–11% range when stored in normal ambient conditions, the method/apparatus is particularly advantageous in that neither the addition of moisture nor the drying of the material are required.

DESCRIPTION OF THE DRAWINGS

A more complete understanding of the invention and many of the attendant advantages thereof will become apparent from the following detailed description, particularly when considered in conjunction with the accompanying drawings in which.

DETAILED DESCRIPTION OF THE PREFERRED EMBODIMENTS

Figure 1A:
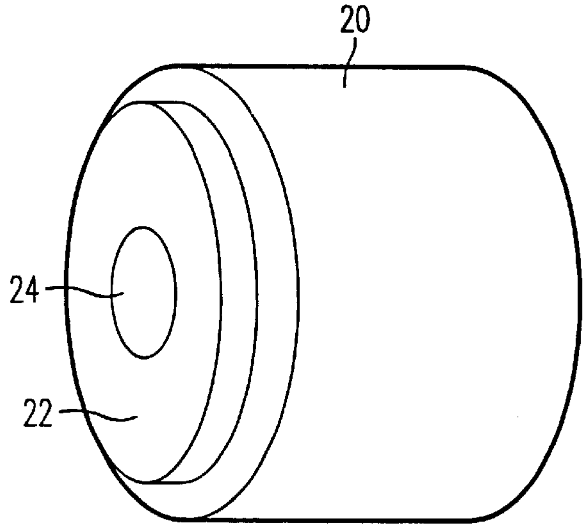
FIGS. 1A and 1B depict a plug and paper fiber core in assembled and unassembled conditions.
Figure 1B:
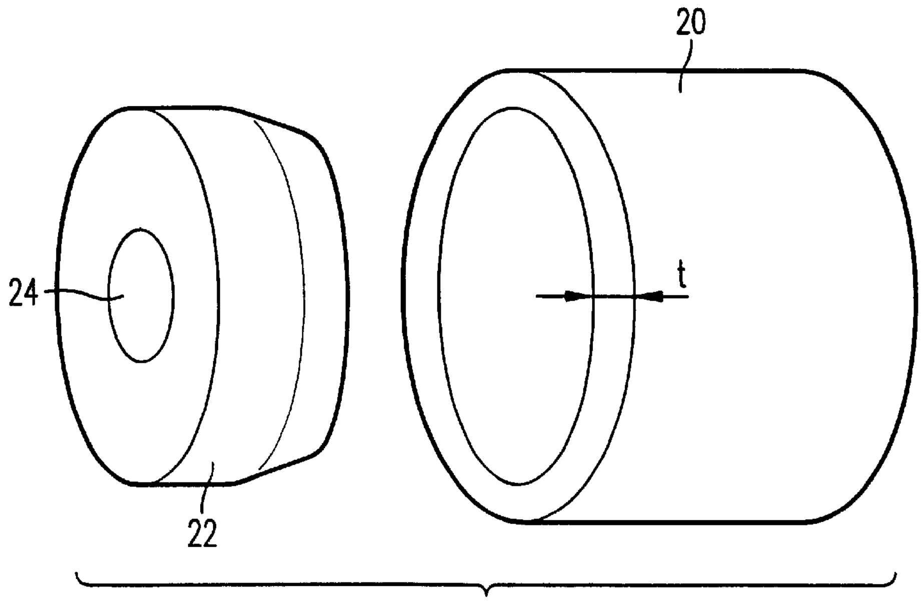
Figure 2:
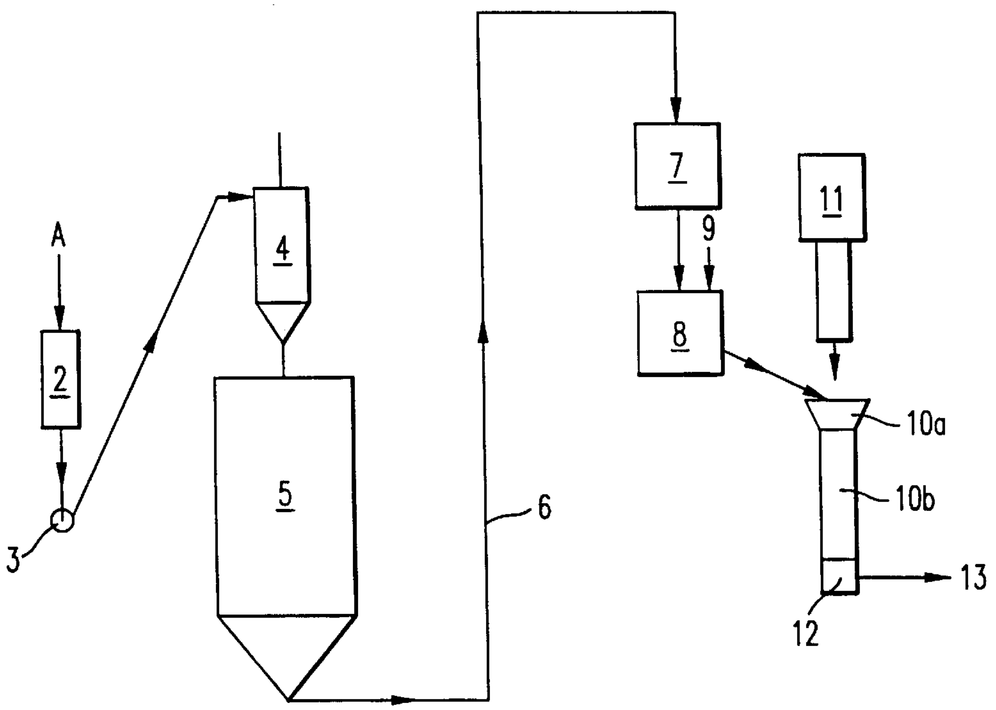
FIG. 2 schematically depicts a system which can be utilized for converting paper fiber cores into molded products.

As noted earlier, the present method and apparatus allow for paper fiber cores 20 as shown, for example, in FIG. 1 to be formed into molded products including the plugs utilized with paper fiber cores as also shown in FIG. 1. FIG. 2 schematically depicts equipment which can be utilized to accomplish the conversion of the paper cores according to the present method as discussed below.

Initially, paper cores are fed (as represented by arrow A) to equipment which will mechanically break down the size of the paper fiber cores. In the presently preferred method/apparatus, this is accomplished by feeding the cores to the cutter/shredder equipment indicated at 2 in FIG. 2. Various types of known equipment can be used for this operation.

According to a presently preferred arrangement which has been found to be suitable for the present method, the cores are first cut in a chipper, similar to chippers utilized for wood products, for example, to form wood chips or mulch chips. Thereafter, the chips are passed through a hammer mill to reduce the size of the chips to confetti-like sizes such that the resulting pieces or particles are each a small bundle of fibers from the paper fiber core. As noted earlier, where the molded product is, e.g., a plug, the fiber bundles are preferably reduced to a size similar to that of a match head or approximately one-quarter of an inch or less. Typically, the particles are irregularly shaped and the use of particles having a size of one-quarter of an inch or less refers to the approximate size of the largest dimension of such particles. Although the cutter/shredder equipment represented at 2 includes two pieces of equipment (first a cutter or chipper, and then a shredder or other particle size reducer such as a hammer mill), it is to be understood that various types of equipment could be utilized for reducing the paper fiber core to pieces of satisfactory size. Once the present method gains widespread use, it could become desirable to design equipment specifically for reducing the paper fiber cores to pieces of satisfactory size, and such equipment could include one or two pieces of machinery. It is also to be understood that, although match head-like particle sizes have been found to be satisfactory, the sizes of the particles used and the uniformity of such particles could vary depending on the molded product which will ultimately be formed, since different products can have different strength requirements. For certain products, larger particle sizes should be suitable. Also, where larger particle sizes are suitable, the use of both cutting and shredding is not necessary and particles of a suitable size could be obtained, e.g., only by cutting the cores in a wood chipper. The molding parameters (the time, heat and pressure utilized in forming the molded product) could also vary depending upon the product to be molded.

The product from the cutter/shredder equipment 2 is then pulled by a blower 3 and blown to a separator device 4. In the process of cutting/shredding the cores and feeding the cut/shredded product with a blower, the product includes a significant amount of air. The separator 4 reduces the amount of air to provide a more compact product. Various types of separators can be utilized. Presently, a cyclonic separator is preferred, however, alternate types of separators could also be utilized. Such separators, in and of themselves, are known.

The product is then fed to a holding device or storage bin 5, which holds the product so that it can be metered out in portions suitable to form each molded article. The storage bin 5 provides a buffer between the molding and the upstream processing equipment. However, it is presently preferable to not utilize the bin for long-term storage, since the cut/shredded product can dry over time, which could necessitate the later addition of moisture as discussed in further detail hereinafter. Thus, it is best to cut/shred the material as needed to complete a particular batch or run in which molded products are formed. Once a sufficient number of cores have been cut/shredded to complete a run, it is presently preferred to store the cores (without shredding/cutting), until the next run is to occur.

The product is fed from the storage location 5 to a metering device 7 via suitable conveying means 6. The conveying means can include an auger or screw-feed-type conveying device. Other types of conveying expedients could also be utilized. The metering device 7 can have various forms. Although it is possible to meter the product into suitable quantities for each molded article by volumetric methods, since the density of the material can vary, it is presently preferred to weight the material into an amount suitable for each molded product. By way of example, approximately 160–180 (preferably 170–175) grams of material has been found suitable to form a three inch diameter plug. Obviously, for larger plugs or for molding different products, the weight will vary. Optionally, one could mix the cut/shredded core material with other materials (e.g., other paper or wood fiber materials) before molding. The desirable weight to form a molded product can also vary depending upon the material(s) with which the core material is mixed.

Parts 8 and 9 of the system of FIG. 2 (and associated method) are optional and, in fact, are preferably avoided. Element 8 represents a mixer, while 9 represents the introduction of water or moisture. In accordance with one aspect of the present method/apparatus, it has been recognized that cores stored in typical ambient conditions have a suitable moisture content such that, when they are cut/shredded, the material is suitable for molding without the introduction of additional materials, such as moisture or adhesives. This differs significantly from the conventional thought concerning recycling of paper products, in which the paper products are slurried or repulped. As noted earlier herein, according to one of the advantageous aspects of the present method/apparatus, the core material is preferably substantially dry throughout the process, from the time the cores are mechanically broken down until the product is molded. As also noted earlier, "substantially dry" as used herein means that the material has a moisture content of less than 20% (using a weigh, dry, weigh method). Preferably, the moisture content is below 15% as discussed in further detail below. There could be certain instances in which the addition of a small amount of moisture might be necessary, and therefore, the introduction of moisture at 9 and the mixing of the cut/shredded product with water at 8 are provided as a potential option. Such cores could be too dry if, for example, they are stored for an excessively long period in the storage bin 5. However, this can typically be avoided if cores are cut and shredded on an as-needed basis.

It is preferable to keep the moisture content from excessively high levels, since a high moisture content can result in the formation of steam upon molding or upon the release of the mold pressure, which could form voids, cracks or other defects in the final molded product. Also, if the moisture content is too low, the product can ignite upon molding. Accordingly, it is preferable to have a moisture content of 4–14%, and more preferably 6–11%. Since cores have been found to have a moisture content in the 6–11% range (typically 10–11% utilizing a weigh, dry, weigh method) when stored in typical ambient conditions, the addition of moisture and mixing of moisture with the cut-shredded product will typically not be utilized, and preferably is not utilized. However, as noted above, if the cut/shredded product should have less than desirable moisture levels, additional moisture can be added. Conversely, if the moisture level should be too high, the material can be dried prior to molding. Even with moisture levels within the preferred range of the invention, cracking of the molded product has been observed. In accordance with a further aspect of the invention, it has been recognized that this cracking can be prevented, or at least reduced, by allowing the molded product to cool before releasing the molding pressure. The mold for the molded product should be cooled to below the boiling point (212° F.) and preferably to 200° F. or below before the molding pressure is released to avoid or reduce any cracking problems.

The correctly metered amount of cut/shredded product is then forwarded to equipment for molding the desired end product. The equipment schematically represented at 10–12 in FIG. 2 is the conventional equipment utilized for molding of plugs. Of course, where other products are to be molded, other types of molding equipment can be utilized. By way of example, and not to be construed as limiting, products (other than plugs) which can be formed in accordance with the present invention can include dunnage strips, particle board-like products, and furniture components. In general, the method/apparatus can be advantageous in forming various types of products, and can provide a high strength, high density. In the equipment shown at 10–12, the cut/shredded product is fed via a funnel **10*a* into a chamber 10*b*, at the bottom of which is disposed a heated mold 12. The material is then compacted utilizing a plunger 11 so that the product is molded under heat and pressure over a time sufficient to allow the material to reach a flowable state so that the product is substantially solid and molded to the final desired shape without excessive amounts of voids or other defects. As noted earlier, particularly if cracking or voids are noticed in the molded product, the mold for the molded product should be cooled (to below 212° F., preferably to 200° F. or below) before the molding pressure (as applied by the plunger 11 in the FIG. 2** arrangement) is released.

Utilizing conventional plug molding equipment, the molds 12 are successively conveyed to and away from the chamber 10, such that after a molding process is completed, the mold having the completed product moves away from the chamber 10, and is replaced with another heated mold 12. In accordance with one type of conventional equipment, the molds 12 are stored in a heated chamber (not shown) such that the molds are preheated when they arrive at the chamber 10. The chamber in which heated molds are stored contains a sufficient number of molds such that the time which a particular mold resides in the chamber is sufficient to preheat the mold to the desired temperature. Thus, the chamber includes plural molds, and a preheated mold is fed to the chamber 10. Once a finished product has been formed in the mold, the molded product is removed and the empty mold is returned to the mold chamber. The mold chamber has a sufficient quantity of molds therein to be used before the newly returned mold such that the newly returned mold is preheated by the time it is to be used again. Although the foregoing description relates to a typical type of molding apparatus/system, it is to be understood that various types of molding arrangements are available and suitable for use with the present invention. For example, certain molding arrangements have heating elements associated with the mold and include a plurality of molds so that multiple products can be formed at the same time. Accordingly, it is to be understood that various types of molding apparatus can be used with the present invention.

In accordance with a further advantage of the present method/apparatus, it is believed that the temperatures and pressures required for the present method/apparatus are reduced as compared with conventional plug forming operations. Further, it is believed that, in forming other molded products, pressure and/or temperature reductions could also be realized as compared with prior methods in which wood chips are mixed with an adhesive and then introduced into a mold. It is believed that typical plug molding pressures are approximately 10,000 psi, and typical temperatures are 375° F. With the present method, pressures of 5,000 psi and temperatures of 290° F. have been found satisfactory. For three inch diameter plugs, a molding time of five to six minutes has been found suitable. The molding time will, of course, vary depending upon the type of molded product and its size. It has also been recognized that the smoothness/roughness of the final molded product can vary depending upon the pressure, temperature, and/or the amount of time the pressure is applied. In particular, by increasing one or more of the pressure, temperature and time parameters, the smoothness of the resulting product can be increased. With respect to three inch plugs, by increasing the molding time from 5–6 minutes to 8–10 minutes, a smoother product will result. However, often excessive smoothness is not desired. For example, with plugs for paper fiber cores, a certain amount of roughness is desired so that the plugs are held securely in the end of the core. For other products, the pressure, temperature and time parameters can be adjusted to provide the desired surface roughness. Of course, surface treatments after the molding process can also be utilized to modify the roughness/smoothness of the molded product if desired. To the extent possible, particularly with molded products formed of paper fiber core materials, it is best to avoid or minimize such subsequent surface modifications, since they not only increase the complexity and cost of the manufacturing process, but they can also cause possible flaking/deterioration of the surface of the product and result in the generation of dust. Thus, in accordance with the present invention, surface treatments (e.g., sanding or other surface treatments to smooth, or possibly to roughen, the product surface) can be performed on the molded product after molding. However, according to one of the advantageous aspects of the invention, it has also been recognized that the need for such surface treatments can often be eliminated or reduced, because the process can be modified to modify the surface characteristics of the molded product.

As should be apparent from the foregoing, the present method/apparatus advantageously converts paper fiber cores into molded articles such as plugs for the cores.

As noted above, the invention can also be used to mold articles other than plugs. In addition, the method/apparatus could also be utilized for converting other paper fiber articles into molded products where the paper fiber article is formed of multiple layers of a paper material which is adhered together by adhesives.

Obviously, numerous modifications and variations of the present invention are possible in light of the above teachings. It is therefore to be understood that, within the scope of the appended claims, the invention may be practiced otherwise and as specifically described herein.

What is claimed is:

1. A process for converting paper fiber cores into a molded product comprising:
   (a) mechanically breaking down paper fiber cores to form particles of paper fiber core material;
   (b) measuring a predetermined quantity of said particles of paper fiber core material; and
   (c) molding said predetermined quantity under pressure in a heated mold to form the molded product;
   wherein said paper fiber core material is substantially dry throughout the process from a time when the paper fiber cores are mechanically broken down until the predetermined quantity is molded, and
   wherein said process is free from a step of adding adhesive to the paper fiber core material from the time when the paper fiber cores are mechanically broken down until the predetermined quantity is molded.

2. A process as recited in claim 1, further comprising, during said molding step, molding a plug for said paper fiber cores.

3. A process as recited in claim 1, wherein the step of mechanically breaking down paper fiber cores includes breaking down the paper fiber cores to particles having sizes equal to or less than approximately one-quarter of an inch.

4. A process as recited in claim 3, wherein the step of mechanically breaking down the paper fiber cores includes cutting the paper fiber cores and then shredding the cut paper fiber cores.

5. A process as recited in claim 4, wherein the paper fiber cores are cut in a wood chipper and the cut paper fiber cores are shredded in a hammer mill.

6. A process as recited in claim 1, wherein the step of mechanically breaking down the paper fiber cores includes cutting the paper fiber cores and then shredding the cut paper fiber cores.

7. A process as recited in claim 6, wherein the paper fiber cores are cut in a wood chipper and the cut paper fiber cores are shredded in a hammer mill.

8. A process as recited in claim 1, further including conveying said particles of paper fiber core material with a blower.

9. A process as recited in claim 8, further including passing said particles of paper fiber core material through a separator to remove air after said particles are conveyed with said blower.

10. A process as recited in claim 1, wherein the step of measuring a predetermined quantity of said particles includes weighing said predetermined quantity of said particles.

11. A process as recited in claim 10, further including:
   conveying said particles to a separator utilizing a blower;
   passing said particles through said separator to remove air;
   after passing said particles through said separator, holding said particles in a container; and
   conveying said particles from said container to a location at which said step of measuring is performed.

12. A process as recited in claim 1, further including, after molding of the molded product, cooling the heated mold to a temperature below 212° F. before releasing a molding pressure that is applied to said molded product during molding.

13. A process for converting paper fiber articles into a molded product, in which the paper fiber articles includes multiple layers of a paper material adhered together with at least one adhesive, the method comprising:
   (a) mechanically breaking down paper fiber articles to form particles of a size of equal to or less than approximately one-quarter of an inch;
   (b) blowing said particles to convey said particles to a separator;
   (c) passing said particles through a separator to remove air;
   (d) retaining said particles in a container;
   (e) conveying said particles from said container to a device for measuring a predetermined quantity of said particles;

(f) measuring said predetermined quantity with said device for measuring;

(g) molding said predetermined quantity under a molding pressure in a heated mold;

(h) cooling said heated mold to a temperature below 212° F.; and (i) releasing said molding pressure after said cooling.

14. A process as recited in claim 13, wherein said particles are substantially dry throughout said process from a time said paper fiber articles are mechanically broken down to form said particles until said predetermined quantity of said particles are molded.

15. A process as recited in claim 14, wherein said paper fiber articles include paper fiber cores, and wherein the molded product comprises plugs for paper fiber cores.

16. A process as recited in claim 13, wherein, after molding of the molded product, the heated mold is cooled to a temperature below 200° F. before releasing said molding pressure.

17. An apparatus for converting paper fiber articles into a molded product, in which the paper fiber articles include multiple layers of a paper material adhered together with at least one adhesive, the apparatus comprising:

(a) means for mechanically breaking down paper fiber articles to form particles a paper fiber material;

(b) a separator;

(c) a blower for conveying said particles from said means for mechanically breaking down to said separator;

(d) a container disposed downstream from said separator for receiving said particles after passing through said separator;

(e) means for measuring a predetermined quantity of said particles;

(f) means for molding said predetermined quantity under a molding pressure;

(g) means for cooling said predetermined quantity to a temperature below 212° F.; and (h) means for releasing said molding pressure after said cooling.

18. An apparatus as recited in claim 17, wherein said means for molding molds plugs for paper fiber cores.

19. An apparatus as recited in claim 18, wherein said means for molding includes a heated mold and means for holding said particles under pressure in said heated mold.

20. An apparatus as recited in claim 19, wherein said means for mechanically breaking down said paper fiber articles forms particles of a size equal to or less than one quarter of an inch.

21. An apparatus as recited in claim 20, wherein said means for mechanically breaking down includes a wood chipper and a hammer mill.

22. An apparatus as recited in claim 21, wherein said particles are substantially dry throughout said apparatus.

23. An apparatus for converting paper fiber cores into a molded product comprising:

(a) means for mechanically breaking down paper fiber cores to form particles of paper fiber core material;

(b) means for measuring a predetermined quantity of said particles of paper fiber core material; and (c) means for molding said predetermined quantity under pressure in a heated mold;

wherein said paper fiber core material is maintained substantially dry throughout said apparatus from said means for mechanically breaking down said paper fiber cores to said means for molding, and wherein said paper fiber core material is free from added adhesive throughout said apparatus from said means for mechanically breaking down said paper fiber cores to said means for molding.

24. An apparatus as recited in claim 23, wherein said means for molding includes means for molding plugs for paper fiber cores.

25. A process as recited in claim 1, wherein the step of molding said predetermined quantity under pressure in a heated mold includes applying a pressure of at least 5000 psi.

26. A process as recited in claim 13, wherein said molding pressure is at least 5000 psi.

27. A process as recited in claim 13, wherein said process is free from a step of adding adhesive to the paper fiber core material from a time when the paper fiber cores are mechanically broken down until the predetermined quantity is molded.

28. A process as recited in claim 17, wherein said molding pressure is at least 5000 psi.

29. An apparatus as recited in claim 17, wherein said paper fiber material is free from added adhesive throughout said apparatus from said means for mechanically breaking down said paper fiber articles to said means for molding.

30. An apparatus as recited in claim 23, wherein said means for molding molds said predetermined quantity with a pressure of at least 5000 psi.

31. An apparatus as recited in claim 23, further comprising:

means for cooling said predetermined quantity to a temperature below 212° F.; and means for releasing a molding pressure applied by said means for molding after said predetermined quantity is cooled by said means for cooling.

32. An apparatus as recited in claim 23, wherein said means for mechanically breaking down comprises a wood chipper.

33. A method of forming a new plug for a paper fiber core, comprising:

(a) disassembling a used plug from a used paper fiber core;

(b) mechanically breaking down said used paper fiber core to form particles of paper fiber core material;

(c) measuring a predetermined quantity of said particles of paper fiber core material; and (d) molding said predetermined quantity under pressure in a heated mold to form said new plug.

34. A method as recited in claim 33, wherein said paper fiber core material is substantially dry throughout the method from a time when the paper fiber core is mechanically broken down until the predetermined quantity is molded.

35. A method as recited in claim 34, wherein said method is free from a step of adding adhesive to the paper fiber core material from a time when the paper fiber core is mechanically broken down until the predetermined quantity is molded.

36. A method as recited in claim 34, further comprising:

(e) cooling said heated mold to a temperature below 212° F.; and (f) releasing said pressure after said cooling.

37. A method as recited in claim 33, wherein the step of molding said predetermined quantity under pressure includes applying a pressure of at least 5000 psi.

38. A process for converting paper fiber cores into a molded product comprising:

(a) mechanically breaking down paper fiber cores to form particles of paper fiber core material;

(b) measuring a predetermined quantity of said particles of paper fiber core material; and (c) molding said predetermined quantity under pressure of at least 5000 psi in a heated mold to form the molded product;

wherein said paper fiber core material is substantially dry throughout the process from a time when the paper fiber cores are mechanically broken down until the predetermined quantity is molded, and wherein said paper fiber core material is in solid form until said molding step.

39. A process as recited in claim 38, wherein said molded product is held together by adhesives present in said paper fiber core material without requiring additional adhesives.

40. A process as recited in claim 38, further including forming a paper fiber core plug during said molding step.

* * * * *

UNITED STATES PATENT AND TRADEMARK OFFICE

CERTIFICATE OF CORRECTION

PATENT NO. : 6,521,151 B2
DATED : February 18, 2003
INVENTOR(S) : John A. Boney, Jr.

It is certified that error appears in the above-identified patent and that said Letters Patent is hereby corrected as shown below:

Column 2,
Line 47, change "product s" to -- products --.

Column 6,
Line 24, change "density." to -- density product. --.

Column 9,
Line 25, change "particles a" to -- particles of a --.

Signed and Sealed this

Ninth Day of September, 2003

JAMES E. ROGAN
*Director of the United States Patent and Trademark Office*